(12) United States Patent
Bishop et al.

(10) Patent No.: US 8,400,294 B2
(45) Date of Patent: Mar. 19, 2013

(54) TRANSIT STOP DETECTION

(75) Inventors: Nathan J. Bishop, Olathe, KS (US);
Qiang Zeng, Olathe, KS (US);
Jonathan L. Hemphill, Lawrence, KS (US)

(73) Assignee: Garmin Switzerland GmbH (CH)

( * ) Notice: Subject to any disclaimer, the term of this patent is extended or adjusted under 35 U.S.C. 154(b) by 501 days.

(21) Appl. No.: 12/643,771

(22) Filed: Dec. 21, 2009

(65) Prior Publication Data

US 2011/0148623 A1 Jun. 23, 2011

(51) Int. Cl.
*G08B 1/08* (2006.01)
(52) U.S. Cl. ............... 340/539.13; 340/539.11; 340/994
(58) Field of Classification Search ............. 340/539.13, 340/539.1, 539.11, 989–994
See application file for complete search history.

(56) References Cited

U.S. PATENT DOCUMENTS

| | | | | |
|---|---|---|---|---|
| 4,075,948 A * | 2/1978 | Minovitch | ................. | 104/138.1 |
| 5,475,597 A | 12/1995 | Buck | ............... | 364/443 |
| 6,374,176 B1 * | 4/2002 | Schmier et al. | ............... | 701/465 |
| 6,658,272 B1 | 12/2003 | Lenchick et al. | ............ | 455/575 |
| 7,467,060 B2 | 12/2008 | Kulach et al. | ................. | 702/141 |
| 2003/0137435 A1 * | 7/2003 | Haddad et al. | ................ | 340/994 |
| 2008/0059061 A1 | 3/2008 | Lee | ............... | 701/209 |
| 2008/0158016 A1 * | 7/2008 | Wang et al. | ................... | 340/993 |
| 2008/0190202 A1 | 8/2008 | Kulach et al. | ............. | 73/514.01 |
| 2008/0214360 A1 | 9/2008 | Kulach et al. | ..................... | 482/9 |
| 2008/0300778 A1 | 12/2008 | Kuznetsov | ................... | 701/200 |
| 2009/0125218 A1 * | 5/2009 | Lee et al. | ....................... | 701/117 |
| 2009/0191854 A1 | 7/2009 | Beason | .......... | 455/418 |
| 2009/0207049 A1 | 8/2009 | Liao | ............ | 340/988 |

FOREIGN PATENT DOCUMENTS

| | | | |
|---|---|---|---|
| JP | 10-232992 | | 9/1998 |
| JP | 2006258517 A | * | 9/2006 |
| JP | 2007-179573 | | 7/2007 |
| KR | 10-1999-0033307 | | 5/1999 |
| KR | 1020060088611 | * | 8/2006 |

OTHER PUBLICATIONS

International Search Report from Corresponding International Application No. PCT/US2010/057936, dated Jul. 28, 2011.
Printout from http://www.csmonitor.com/Innovation/Horizons/2009/0731/boston-partners-with-google-transit-why-the-hold-up-in-dc , 6 pages, published Jul. 31, 2009.
Printout from http://www.technologyreview.com/communications/22907/?a=f 4 pages, published Jun. 22, 2009.
Garmin's nüvi 1200/1300/1400 Series Owner's Manual, printed Apr. 9, 2009.
U.S. Appl. No. 11/696,478, filed Apr. 4, 2007.

* cited by examiner

*Primary Examiner* — Jennifer Mehmood
*Assistant Examiner* — Nay Tun
(74) *Attorney, Agent, or Firm* — Samuel M. Korte; Mohammad M. Ali

(57) ABSTRACT

Techniques are described that may be implemented in a portable electronic device to provide automatic detection of transit stops made by mass transit system vehicle in which a user of the device is a passenger. In an implementation, the portable electronic device includes an inertial sensor assembly to sense motion of the vehicle and generate a signal indicative of the vehicle motion. The inertial sensor assembly signal is used to detect the occurrence of a transit stop made by the vehicle. The portable electronic device can then display a prompt in response to detection of the transit stop. In embodiments, other measured data (e.g., elapsed time from a prior event, location information, direction, sound, and so on) may be used to verify the occurrence of the transit stop.

20 Claims, 6 Drawing Sheets

TRANSIT STOP DETECTION

BACKGROUND

In many metropolitan areas, mass transit systems provide an efficient and economical alternative to private modes of transportation such as personal automobiles or vehicles for hire. However, mass transit systems can be confusing to navigate, especially in unfamiliar areas. For instance, a traveler boarding a mass transit system vehicle in an unfamiliar city must discern when a transit stop made by the vehicle is near his or her destination, when he or she must transfer between vehicles at a transit stop, and when it is necessary to use two or more different mass transit systems such as a train of a light rail system and a bus to reach his or her destination.

SUMMARY

Portable electronic devices such as personal navigation devices, smart phones, personal digital assistants, and so forth, may be configured to provide pedestrian navigation functionality. Such devices may employ information about mass transit system schedules, transit stop locations, and so on, to assist their users in navigating to a desired destination using mass transit. In some instances, multi-mode routing techniques may be employed to instruct the user when to walk and when to use mass transit (e.g., when to board a mass transit system vehicle, transfer between mass transit system vehicles, disembark a mass transit system vehicle, and so on). In this manner, the user may efficiently use multiple modes of transit to reach his or her destination.

Techniques are described that may be implemented in a portable electronic device to provide automatic detection of transit stops made by a vehicle of a mass transit system. In an implementation, the portable electronic device includes an inertial sensor assembly to sense motion of the vehicle in which a user of the portable electronic device is a passenger and generate a signal indicative of the vehicle motion. The inertial sensor assembly signal is used to detect the occurrence of a transit stop made by the vehicle. The portable electronic device can then display a prompt in response to detection of the transit stop. In embodiments, other measured data (e.g., elapsed time from a prior event, location information, direction, sound, and so on) may be used to verify the occurrence of the transit stop.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
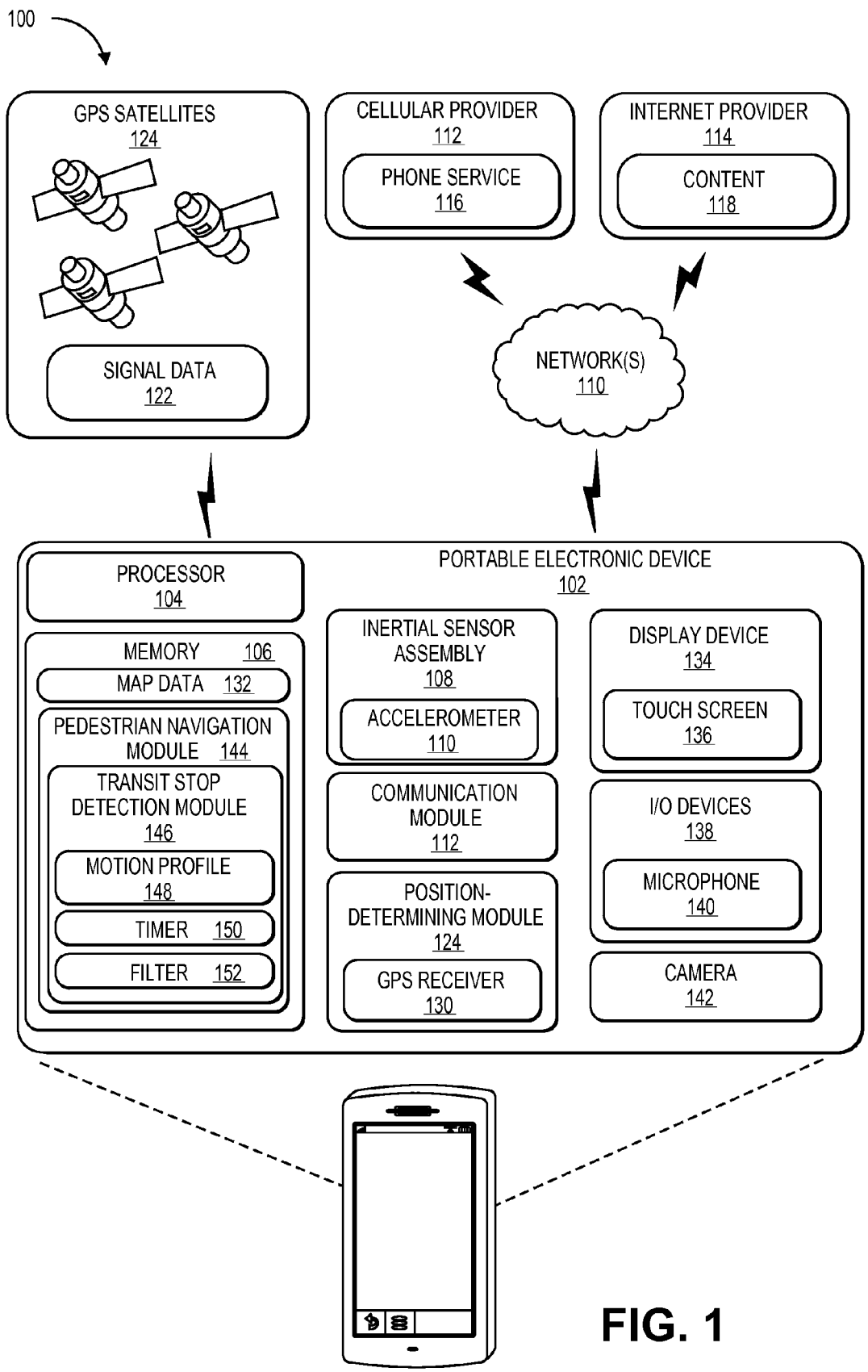
FIG. 1 is an illustration of an environment in an example implementation employing a portable electronic device that is operable to provide automatic detection of transit stops made by a vehicle of a mass transit system.

Many portable electronic devices use a global navigation satellite system (GNSS) such as the global positioning system (GPS) to provide pedestrian navigation functionality. However, during pedestrian navigation, it is often not possible to receive satellite navigation signals. For example, a GPS-enabled portable electronic device may be unable to receive satellite navigation signals while the user is on board a mass transit system vehicle, particularly a vehicle such as a subway train that operates underground. Consequently, scheduled transit stops made along the route traversed by the vehicle cannot be detected so that appropriate navigation information may be provided to the user. Instead, the user may be required to manually sequence (e.g., tab) through the navigation information as the vehicle reaches each stop. Should the user miss a transit stop or sequence information for a transit stop not yet reached through error or distraction, the navigation information provided by the device may become out of sync with the vehicle's actual location along the route.

Accordingly, techniques are described that may be implemented in a portable electronic device to provide automatic detection of transit stops made by a mass transit system vehicle in which a user of the device is a passenger. The techniques may be utilized, for example, to detect transit stops made while the device is unable to receive satellite navigation signals from GNSS (e.g., GPS) transmitters. In an implementation, the portable electronic device is configured to calculate and display route information describing at least part of a route that is traversed by a user using the mass transportation system vehicle.

The portable electronic device is provided with an inertial sensor assembly that includes an inertial sensor such as an accelerometer. The inertial sensor assembly is configured to sense motion of the vehicle and to generate a signal indicative of the sensed vehicle motion. In an implementation, the inertial sensor assembly is configured to detect motion of the portable electronic device cause by the motion of the vehicle—such as in situations where a user of the portable electronic device carries the device while riding the mass transit vehicle. The inertial sensor assembly signal is used to detect the occurrence of a transit stop made by the vehicle. In embodiments, functionality is provided to distinguish motion of the vehicle during a transit stop from other movement of the device to determine when a transit stop has been made. The device can then display a prompt in response to the detected transit stop, for example, to indicate to the user that the vehicle has reached the transit stop. In embodiments, other data such as an elapsed time from a prior event, geographic position from a position-determining module (e.g., a GNSS (GPS) receiver), location information from a wireless network, ambient sound detected from a microphone, and so on, may be used to verify the occurrence of the transit stop.

In the following discussion, an example portable electronic device environment is first described. Exemplary procedures are then described that may be employed with the example environment, as well as with other environments and devices without departing from the spirit and scope thereof. Example display screens of the portable electronic device are then described that may be employed in the illustrated environment, as well as in other environments without departing from the spirit and scope thereof.

Example Environment

FIG. 1 illustrates an example portable electronic device environment 100 that is operable to perform the techniques discussed herein. The environment 100 includes a portable electronic device 102 operable to provide automatic detection of transit stops made by a mass transit system vehicle and display an indication that the vehicle has reached the transit stop to a user of the device 102. The term "transit stop" refers to a scheduled stop made by a mass transit system vehicle. Transit stops may include stops made at a station or terminal to load and unload passengers, scheduled stops made to allow passage of a second mass transit system vehicle, and so on. The term "mass transit system vehicle" refers to any vehicle that is configured to carry passengers which is operated in a mass transit system, whether public or private, such as a bus of a bus line, a train of a light rail system, a train of a subway, a trolley, a ferry, and the like. Other examples are possible.

The portable electronic device 102 may be configured in a variety of ways. For instance, a portable electronic device 102 may be configured as a personal navigation device, a mobile phone, a smart phone, a position-determining device, a handheld portable computer, a personal digital assistant, a multimedia device, a game device, combinations thereof, and so forth. In the following description, a referenced component, such as portable electronic device 102, may refer to one or more entities, and therefore by convention reference may be made to a single entity (e.g., the portable electronic device 102) or multiple entities (e.g., the portable electronic devices 102, the plurality of portable electronic devices 102, and so on) using the same reference number.

In FIG. 1, the portable electronic device 102 is illustrated as including a processor 104 and a memory 106. The processor 104 provides processing functionality for the portable electronic device 102 and may include any number of processors, micro-controllers, or other processing systems and resident or external memory for storing data and other information accessed or generated by the portable electronic device 102. The processor 104 may execute one or more software programs that implement the techniques and modules described herein. The processor 104 is not limited by the materials from which it is formed or the processing mechanisms employed therein and, as such, may be implemented via semiconductor(s) and/or transistors (e.g., electronic integrated circuits (ICs)), and so forth.

The memory 106 is an example of device-readable storage media that provides storage functionality to store various data associated with the operation of the portable electronic device 102, such as the software program and code segments mentioned above, or other data to instruct the processor 104 and other elements of the portable electronic device 102 to perform the techniques described herein. Although a single memory 106 is shown, a wide variety of types and combinations of memory may be employed. The memory 106 may be integral with the processor 104, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the portable electronic device 102, the memory 106 may include removable ICC (Integrated Circuit Card) memory such as provided by SIM (Subscriber Identity Module) cards, USIM (Universal Subscriber identity Module) cards, UICC (Universal Integrated Circuit Cards), and so on.

The portable electronic device 102 includes an inertial sensor assembly 108 that comprises one or more inertial sensors which are operable to sense movement of the device 102 caused by motion of the mass transit system vehicle. The inertial sensor assembly 108 generates a signal in response to this sensed movement that is indicative of the motion of the vehicle. The inertial sensor assembly 108 may be configured in a variety of ways to provide signals to enable detection of movement of the portable electronic device 102 including detecting displacement, velocity, acceleration, and so forth. For instance, the inertial sensor assembly 108 may comprise one or more accelerometers 110 configured to measure the acceleration experienced by the portable electronic device 102. The accelerometers 110 may be single-axis accelerometers or multiple-axis accelerometers such as two-axis accelerometers or the like. In one or more embodiments, the accelerometers 110 may comprise micro electro-mechanical systems (MEMS) accelerometers 110, which may be either single-axis or multiple-axis (e.g., two-axis, three-axis, etc.) accelerometers 110. The inertial sensor assembly 108 may also comprise various components used in place of, or in combination with, the one or more accelerometers 110 to detect movement of the portable electronic device 102. For example, in embodiments, the inertial sensor assembly 108 may include a compass, a gyroscope, a velocimeter, a tilt sensor, and so on Like the accelerometers 110 described above, these components may employ micro electro-mechanical systems (MEMS) technologies in their construction.

The portable electronic device 102 may further include a communication module 112 representative of communication functionality to permit portable electronic device 102 to send/receive data between different devices (e.g., components/peripherals) and/or over the one or more networks 114. The communication module 112 may be representative of a variety of communication components and functionality including, but not limited to: one or more antennas; a browser; a transmitter and/or receiver; a wireless radio; data ports; software interfaces and drivers; networking interfaces; data processing components; and so forth.

The one or more networks 114 are representative of a variety of different communication pathways and network connections which may be employed, individually or in combinations, to communicate among the components of the environment 100. Thus, the one or more networks 114 may be representative of communication pathways achieved using a single network or multiple networks. Further, the one or more networks 114 are representative of a variety of different types of networks and connections that are contemplated including, but not limited to: the Internet; an intranet; a satellite network; a cellular network; a mobile data network; wired and/or wireless connections; and so forth.

Examples of wireless networks include, but are not limited to: networks configured for communications according to one or more standards of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through universal serial bus (USB), Ethernet, serial connections, and so forth.

The portable electronic device 102, through functionality represented by the communication module 112, may be configured to communicate via one or more networks 114 with a cellular provider 116 and an Internet provider 118 to receive mobile phone service 120 and various content 122, respectively. Content 122 may represent a variety of different content, examples of which include, but are not limited to: map data; mass transit system route and/or schedule information; web pages; services; music; photographs; video; email service; instant messaging; and so forth.

In an implementation, the portable electronic device 102 may include functionality to determine position. More particularly, portable electronic device 102 may include a position-determining module 124 that may manage and process signal data 126 received from Global Positioning System (GPS) satellites 128 via a GPS receiver 130. For example, portable electronic device 102 may receive signal data 126 transmitted by one or more position data platforms and/or position data transmitters, examples of which are depicted as the GPS satellites 128. The position-determining module 124 is representative of functionality operable to determine a geographic position through processing of the received signal data 126. The signal data 126 may include various data suitable for use in position determination, such as timing signals, ranging signals, ephemerides, almanacs, and so forth.

The position-determining module 124 may also be configured to provide a variety of other position-determining functionality. Position-determining functionality, for purposes of discussion herein, may relate to a variety of different navigation techniques and other techniques that may be supported by "knowing" one or more positions. For instance, position-determining functionality may be employed to provide location information, timing information, speed information, and a variety of other navigation-related data. Accordingly, the position-determining module 124 may be configured in a variety of ways to perform a wide variety of functions. For example, the position-determining module 124 may be configured for pedestrian navigation, outdoor navigation, vehicle navigation, aerial navigation (e.g., for airplanes, helicopters), marine navigation, personal use (e.g., as a part of fitness-related equipment), and so forth. Accordingly, the position-determining module 124 may include a variety of devices to determine position using one or more of the techniques previously described.

The position-determining module 124, for instance, may use signal data 126 received via the GPS receiver 130 in combination with map data 132 that is stored in the memory 106 to calculate a route comprising various navigation instructions (e.g., step-by-step instructions to an input destination or POI), show a current position on a map, and so on. In embodiments, map data 132 may include street map data, mass transit system route and/or schedule data, and so forth. The position-determining module 124 may include one or more antennas to receive signal data 126 as well as to perform other communications, such as communication via the one or more networks 114. The position-determining module 124 may also provide other position-determining functionality, such as to determine an average speed, calculate an arrival time, and so on.

Although a GPS system is described and illustrated in relation to FIG. 1, it should be apparent that a wide variety of other positioning systems may also be employed, such as other global navigation satellite systems (GNSS), terrestrial based systems (e.g., wireless-phone based systems that broadcast position data from cellular towers), wireless networks that transmit positioning signals, and so on. For example, positioning-determining functionality may be implemented through use of a server in a server-based architecture, from a ground-based infrastructure, through one or more sensors (e.g., accelerometers, gyros, odometers, and magnetometers), use of "dead reckoning" techniques, and so on.

The portable electronic device 102 includes a display device 134 to display information to a user of the portable electronic device 102. In embodiments, the display device 134 may comprise an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display device 134 may be backlit via a backlight such that it may be viewed in the dark or other low-light environments.

The display device 134 may be provided with a touch screen 136 for entry of data and commands. For example, a user may operate the portable electronic device 102 by touching the touch screen 136 and/or by performing gestures on the screen 136. In some embodiments, the touch screen 136 may be a capacitive touch screen, a resistive touch screen, an infrared touch screen, combinations thereof, and the like. The portable electronic device 102 may further include one or more input/output (I/O) devices 138 (e.g., a keypad, buttons, a wireless input device, a thumbwheel input device, a trackstick input device, and so on). The I/O devices 138 may include a microphone 140 as well as other audio I/O devices such as speakers, and so on.

The portable electronic device 102 of FIG. 1 may be provided with an integrated camera 142 that is configured to capture media such as still photographs and/or video by digitally recording images using an electronic image sensor. Media captured by the camera 142 may be stored as digital image files in memory 106. In embodiments, the digital image files may be stored using a variety of file formats. For example, digital photographs may be stored using a Joint Photography Experts Group standard (JPEG) file format. Other digital image file formats include Tagged Image File Format (TIFF), Raw data formats, and so on. Digital video may be stored using a Motion Picture Experts Group (MPEG) file format, an Audio Video Interleave (AVI) file format, a Digital Video (DV) file format, a Windows Media Video (WMV) format, and so forth. Exchangeable image file format (Exif) data may be included with digital image files to provide metadata about the image media. For example, Exif data may include the date and time the image media was captured, the location where the media was captured, and the like. Digital image media may be displayed by display device 134 and/or transmitted to other devices via a network 114 (e.g., via an email or MMS text message).

In accordance with the techniques described herein, the portable electronic device 102 is illustrated as including a pedestrian navigation module 144, which is storable in memory 106 and executable by the processor 104. The pedestrian navigation module 144 is representative of functionality to provide pedestrian navigation features to a user of the portable electronic device 102 to assist the user in navigating to a desired destination (e.g., an address, a POI, a set of map coordinates, and so on, entered or selected by the user) by walking and/or using mass transit. The pedestrian navigation module 144 may, for example, generate navigation information utilizing map data 132 stored in memory 106 and/or received as content by the communication module 112 via one or more networks 114. Example pedestrian navigation information may include maps, route information including step-by-step or turn-by-turn instructions, information about mass transit system schedules, locations of transit stops, and so on.

In embodiments, the pedestrian navigation module 144 is configured to cause the display device 134 to display route information on a moving map display. The route information describes a route that is traversed by the user to reach the desired destination. In some instances, at least part of a route may be traversed using vehicles of one or more mass transit systems. For example, the pedestrian navigation module 144 may employ multi-mode routing techniques to generate a route to the desired destination that includes two or more legs which employ different modes of transportation. Navigation information may then be provided for each leg of the route according to the transportation mode used. For instance, graphical and or textual step-by-step navigation instructions may be displayed by the display device 134 or furnished as audio by an audio I/O device 138 such as a speaker. The navigation instructions may, for example, instruct the user where to walk, where to drive, when and/or where to board a mass transit system vehicle (such as a subway, light rail, tram, or the like), when to transfer between mass transit system vehicles, when to disembark a mass transit system vehicle, and so on. In this manner, the user may efficiently use multiple modes of mass transit to reach his or her destination.

When a mass transit system is used to traverse a route, transit stops made by the mass transit system vehicle may be used to distinguish the legs of the route that is traversed. For example, the user may be instructed to disembark the mass transit system vehicle or transfer to another vehicle at a particular transit stop. Similarly, progress along a leg of the route may be ascertained by identifying transit stops that occur within the leg as they are reached. Thus, a user may be instructed, for example, that he or she is to disembark from a transit system vehicle at the third transit stop reached by the vehicle, with reminders provided at the second transit stop. Accordingly, the pedestrian navigation module 144 may cause one or more transit stops along a route traversed by a mass transit system vehicle to be displayed by the display device 134. For example, transit stops may be displayed as transition points between consecutive legs of the route.

The pedestrian navigation module 144 includes functionality to automatically detect the occurrence of a transit stop made by a vehicle of a mass transit system along a route that is traversed using the vehicle. The pedestrian navigation module 144 may then cause an indication that the transit stop has been detected (e.g., that the mass transit system vehicle has reached the transit stop) to be furnished to the user. For example, the pedestrian navigation module 144 may cause the display device 134 to display navigation information indicating that the vehicle has reached the transit stop. An audible prompt may also be provided.

In various implementations, the pedestrian navigation module 144 utilizes location information furnished by the position-determining module 124 to detect the occurrence of a transit stop. For instance, the pedestrian navigation module 144 may compare a geographic position furnished by the GPS receiver 130 with map data 132 stored in memory 106 to identify when the mass transit system vehicle reaches a transit stop. In embodiments, the pedestrian navigation module 144 may employ map matching techniques to ascertain when a location corresponding to a transit stop has been reached.

In some instances, location information generated by the position-determining module 124 may not be available. For example, GPS satellite navigation signals may not be received when the mass transit system vehicle used is underground (e.g., is a subway), is surrounded by man-made structures (e.g., is surrounded by buildings, tunnels, bridges, and so forth), or does not permit reception of signal data 126 (e.g., the cab structure of the vehicle interferes with reception of signal data 126). Accordingly, in the implementation shown in FIG. 1, the pedestrian navigation module 144 is illustrated as including a transit stop detection module 146. The transit stop detection module 146 represents functionality to determine that a transit stop has occurred independently of location information generated by the position-determining module 124. Thus, the transit stop detection module 146 provides functionality to detect the occurrence of a transit stop when geographic position is not available (e.g., when signal data 126 is not received by the GPS receiver 130). However, it is contemplated that data generated by the transit stop detection module 146 may also be used by the pedestrian navigation module 144 to confirm the occurrence of a transit stop detected using the geographic position of the device 102 from the position-determining module 124 (e.g., when signal data 126 is available from the GPS receiver 130).

The transit stop detection module 146 is configured to monitor signals generated by the inertial sensor assembly 108 to determine when a transit stop has occurred. In embodiments, the signals generated by the inertial sensor assembly 108 may include data describing displacement, velocity, acceleration, direction, and so on. For instance, where the inertial sensor assembly 108 comprises one or more accelerometers 110, the signal may be indicative of the acceleration of the mass transit vehicle.

The transit stop detection module 146 may employ techniques to distinguish motion of the vehicle that occurs during a transit stop from other movement of the portable electronic device 102, such as movement of the portable electronic device 102 caused by the user (e.g., the user removing the device 102 from his or her pocket, dropping the device 102, and so forth). In one embodiment, the transit stop detection module 146 may be configured to compare the motion detected by the inertial sensor assembly 108 with a motion profile 148 describing the magnitude, direction, and/or duration of motion that occurs during a typical transit stop made by the mass transit system vehicle. For example, the motion profile 148 may comprise an acceleration profile describing the magnitude and duration of the acceleration typically encountered during a transit stop. The transit stop detection module 146 may thus compare accelerations sensed by the one or more accelerometers 110 with the acceleration profile to ascertain if the acceleration matches the profile. In embodiments, the motion profile 148 may be accessed from a database, a look-up table, or like data structure, stored in memory 106 or received as content 122 by communication module 112 via network 114.

Figure 2:
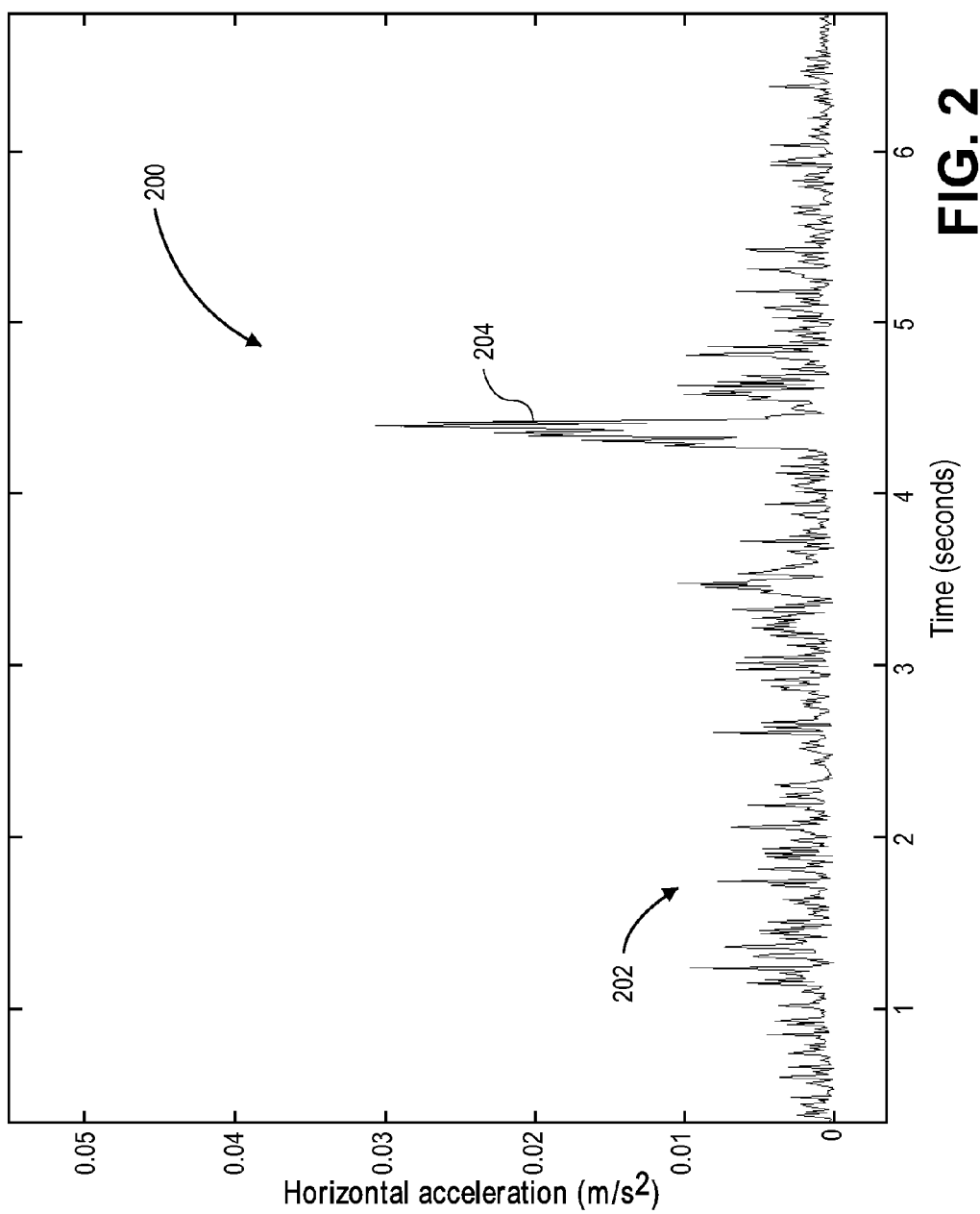
FIG. 2 is an illustration depicting an example acceleration profile of a transit stop made by a vehicle of a mass transit system.

FIG. 2 illustrates an acceleration profile 200 encountered during a transit stop made by an example mass transit system vehicle. As shown, the acceleration 202 measured for the vehicle illustrates a characteristic spike 204 caused by deceleration of the mass transit system vehicle as it comes to a halt during the transit stop. For the particular embodiment shown in FIG. 2, the spike 204 in acceleration has a magnitude of approximately 0.03 m/s$^2$ and occurs at approximately 4.5 seconds. Variations in acceleration 202 due to other movement of the portable electronic device 102 normally do not replicate this spike 204. For example, movement caused the normal motion of the mass transit system vehicle has a lower magnitude (e.g., not more than approximately 0.01 m/s$^2$) and may appear as noise. In some situations, movement of the electronic device 102 may create acceleration measurements similar to the spike 204. In such situations, other inertial data (such as acceleration taken along another axis), or the various methods discussed below, may be utilized to determine if the spike 204 corresponds to a transit stop.

In embodiments, a general motion profile may be utilized which represents a transit stop made by a typical mass transit vehicle. However, unique acceleration profiles may be provided for vehicles of different mass transit systems, for individual vehicles within a single mass transit system, for each transit stop made by each vehicle of a mass transit system, combinations of such profiles, and so on. For example, a geo-referenced database of motion profiles corresponding to a plurality of unique transit stops may be accessed by the device 102 to select a motion profile corresponding to an upcoming transit stop. Other motion profiles 148 such as displacement profiles, velocity (speed) profiles, and so on, may also be utilized depending on the type of movement sensed by the inertial sensors of the inertial sensor assembly 108.

It is contemplated that a mass transit system vehicle may stop at a point along a route that does not correspond to a transit stop. For example, a subway train may stop to maintain a set spacing with a second train; a light rail train may be routed onto a side track to allow a second train to pass; and so on. In such instances, movement (e.g., acceleration) of the portable electronic device 102 sensed by the inertial sensor assembly 108 may approximate movement experienced during a scheduled transit stop, creating a false indication that a transit stop has occurred. Accordingly, the transit stop detection module 146 may include functionality to confirm that a transit stop has in fact occurred when motion indicating that the vehicle has stopped is detected by the inertial sensor assembly 108.

A variety of data may be monitored by the traffic stop detection module 146 to confirm the occurrence of a traffic stop. For instance, as shown in FIG. 1, the transit stop detection module 146 is illustrated as including a timer 150. The timer 150 represents functionality to determine an elapsed time from a prior event, such as a prior transit stop, or the like. The transit stop detection module 146 may use the elapsed time in the determination of whether a stop made by the mass transit system vehicle is a transit stop along the route being traversed. For example, the time required to travel from a first transit stop to a second transit stop may be stored in memory 106 and associated with map data 132. When the vehicle leaves the first transit stop, the timer 150 is initiated to measure the time elapsed while the vehicle is moving until the inertial sensor assembly 108 again detects movement indicating that the vehicle is stopping. When the elapsed time measured by the timer 150 is less than the time required to travel from the first transit stop to the second transit stop, the transit stop detection module 146 may determine that the transit stop has not yet been reached. In embodiments, time spent in the vehicle while the vehicle is stopped between transit stops is subtracted from the elapsed time. In this manner, the transit stop detection module 146 may utilize elapsed time to account for multiple unplanned stops by the vehicle between scheduled transit stops. The transit stop detection module 146 may further monitor inputs including, but not limited to: a geographic position from the position-determining module 124; sound from the microphone 140; location information received from a wireless network 114; and so forth.

In various implementations, the microphone 140 may detect ambient sounds present in the mass transit vehicle. For example, mass transit systems often employ a characteristic "beep" or "bell" shortly before coming to a transit stop. By continuously or periodically listening for the characteristic beep or other ambient sounds using the microphone 140, the device 102 may receive additional information indicating that a transit stop is occurring or has occurred.

In various implementations, wireless network 114 information may be employed by the device to determine if a transit stop has occurred or is occurring. For example, a unique Wi-Fi hotspot associated with the wireless network 114 may be located at a particular transit stop. By accessing a database of Wi-Fi hotspots and associated transit stops, the device 102 may detect the occurrence of a transit stop when the communication module 112 comes within range of the hotspot associated with the upcoming transit spot. Information in addition to, or as an alternative to, hotspot information may also be utilized. For example, cellular tower signal strength may be employed to detect transit stops where cellular reception is possible on a leg of a mass transit route only near transit stops.

The various data and inputs may be combined to detect and/or confirm the occurrence of transit stops along the route using a suitable data filter 152. In one or more embodiments, the filter 152 may comprise a Kalman filter. The Kalman filter may be configured to account for noise in the measured movement information and other data (e.g., location, displacement, velocity, acceleration, elapsed time, direction, and so on) by employing a model of the dynamics of the mass transit system vehicle, which describes the kind of movement possible by the vehicle, to remove the effects of the noise and provide an accurate estimate of the location of the vehicle.

The Kalman filter may also be provided various inputs concerning the position of the mass transit vehicle, such as timing information, acceleration information, ambient sound information, wireless network information, combinations thereof, and the like, to assemble and weight the inputs to accurately estimate if a transit stop has occurred. However, it is contemplated that the transit stop detection module 146 can employ other types of filters 152 in addition to or instead of a Kalman filter. For example, a filter 152 that employs weighted averages to combine the movement information and other data may be used.

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. In the case of a software implementation, for instance, the module represents executable instructions that perform specified tasks when executed on a processor, such as the processor 104 with the portable electronic device 102 of FIG. 1. The program code can be stored in one or more device-readable storage media, an example of which is the memory 106 associated with the portable electronic device 102 of FIG. 1.

Example Procedures

The following discussion describes procedures that may be implemented in a portable electronic device to provide automatic detection of transit stops made by a mass transit system vehicle along a route traversed using the vehicle. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1. The features of techniques described below are platform-independent, meaning that the techniques may be implemented on a variety of commercial device platforms having a variety of processors.

Figure 3:
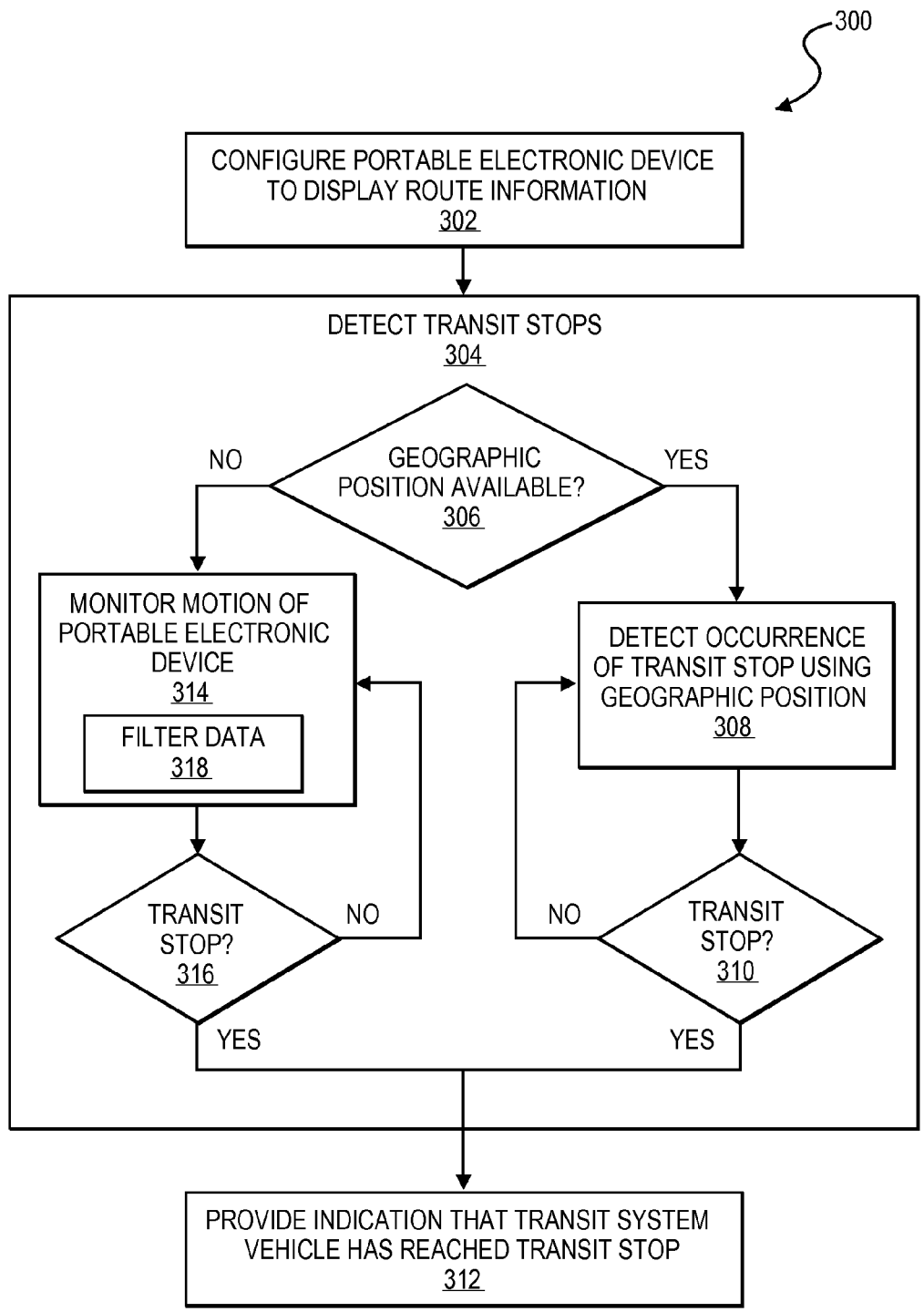
FIG. 3 is a flow diagram depicting a procedure in an example implementation in which transit stops made by a vehicle of a mass transit system are detected by the portable electronic device of FIG. 1.

FIG. 3 depicts a procedure 300 in an example implementation in which transit stops made by a mass transit system vehicle along a route traversed using the vehicle are detected.

As shown, a portable electronic device 102 is configured to display route information describing at least part of a route traversed using one or more mass transit system vehicles (Block 302). For example, a user of the portable electronic device 102 may select a pedestrian navigation mode. The user may then enter or select a desired destination by entering information using the touch screen 136 in response prompts displayed by the display device 134. Route information describing the route to be taken to the destination may then be displayed. In embodiments, the route information may include a graphical depiction of the route to the destination superimposed over a moving map (see, e.g., FIG. 4). The route may include indications of transit stops made along legs of the route traversed by the mass transit system vehicle.

As the route is traversed, transit stops along the route are detected (Block 304). In the implementation illustrated, location information from the position-determining module 124 may be used to detect transit stops. Accordingly, a determination is made whether a geographic position is available from the position-determining module 124 (Decision Block 306). When a geographic position is determined to be available ("Yes" from Decision Block 306), the geographic position is used to detect the occurrence of transit stops along the route (Block 308). For example, as described in the discussion of FIG. 1, a geographic position furnished by the position-determining module 124 may be compared with map data 132 stored in memory 106 using map matching techniques to ascertain when a location corresponding to a transit stop has been reached. When a transit stop is detected ("Yes" at Decision Block 310), an indication that the mass transit system vehicle has reached the transit stop may be furnished to the user (Block 312).

When a geographic position is determined to not be available ("No" from Decision Block 306), motion detected by the inertial sensor assembly 108 is monitored (Block 314) to detect when the vehicle stops. For instance, in embodiments where the inertial sensor assembly 108 comprises one or more accelerometers 110, signals generated by the inertial sensor assembly 108 may be monitored to detect deceleration of the vehicle as it stops. Additional data including, but not limited to: displacement velocity, and direction determined by components of the inertial sensor assembly 108, elapsed time from a prior event determined by the timer 150, a geographic position from the position-determining module 124, location information from a wireless network 114 ambient sound from microphone 140, may also be monitored to detect the occurrence of the stop by the mass transit system vehicle, and/or to verify that a detected stop is in fact a scheduled transit stop and not an unscheduled stop. For example, the inertial sensor assembly signal and/or other data describing movement (e.g., displacement, velocity, acceleration, direction) of the portable electronic device 102, elapsed time from a prior event, ambient sound, and so on, may be filtered (Block 318) using a suitable filter such as a Kalman filter, a weighted average filter, or the like, to detect the occurrence of a transit stop.

As shown in FIG. 3, monitoring continues ("No" at Decision Block 316) until a transit stop is detected ("Yes" at Decision Block 316), or until a geographic position is again available from the position-determining module 124 ("Yes" at Decision Block 306). When a transit stop is detected ("Yes" at Decision Block 316), an indication that the mass transit system vehicle has reached the transit stop may be furnished to the user (Block 312).

The detection of transit stops may be indicated to the user in a variety of ways. For example, navigation information such as a prompt may be displayed by the display device 134 to inform the user that the vehicle has reached the transit stop. An audible prompt (e.g., an audible (spoken) navigation instruction) and/or a vibration prompt may also be provided. Navigation instructions for the next leg of the route may also be provided upon detection of the transit stop, facilitating automatic sequencing through the legs of the route by the portable electronic device 102 as the route is traversed.

It is contemplated that, in some embodiments, movement of the portable electronic device 102 detected by the inertial sensor assembly 108 may be monitored (Block 312) to detect when the vehicle stops when a geographic position is determined to be available ("Yes" from Decision Block 306). In this manner, any detected movement of the portable electronic device 102 may augment the use of geographic position data to verify the occurrence of a detected transit stop.

Example Displays

The following discussion describes example display screens that may be generated using the processes and techniques discussed herein. Aspects of the display screens may be generated in hardware, firmware, software, or a combination thereof. In portions of the following discussion, reference will be made to the environment 100 of FIG. 1, the procedures 300 of FIG. 3, and/or other example environments and procedures.

FIGS. 4A through 4E illustrate a progression of display screens 400 of the portable electronic device 102 of FIG. 1. As shown, display screens 400 are configured to display navigation information 402 that includes graphical route information 404 superimposed over a moving map 406. The route information 404 indicates a route 408 to be traversed by a user of the portable electronic device 102 to reach a destination 410, indicated in the illustrated example, by a flag icon 412. Indicia 414 indicate the location of the personal electronic device 102 along the route.

In embodiments, the route information 404 may be generated using multi-mode routing techniques to assist the user in navigating to the destination 410 by walking and/or using mass transit. Thus, the route 408 displayed may include two or more legs 416 that employ different modes of transportation. Each leg 416 is illustrated as being separated from adjacent legs 416 by a transition point 418 that represents a transition from a current leg 416 to a next leg 416 of the route 408. In the illustrated example, icons 420 may be displayed adjacent to each transition point 418 to indicate the mode of transportation to be used while traversing the following leg 416. Further, as shown, when a leg 416 of the route is successfully traversed, the leg 416 may be highlighted to indicate progress made along the route 408.

Navigation instructions 422 may be provided for the various legs and/or transition points 418 of the route 408. The navigation instructions 422 indicate the next action to be taken by the user as the user traverses the route 408. For example, the navigation instructions illustrated in FIGS. 4A through 4E include instructions to "Get off bus at Midway Terminal," "Transfer to Metro Railway Orange Line at Midway Terminal," "Get off Metro Railway at Pulaski stop," "Transfer to Bus 62 at Pulaski towards State & Kinzie—SB," and Take Bus 62 towards Hotel at 1523 Main Street." A variety of other navigation instructions 422 may provided. In the illustrated implementation, the navigation instructions may include a graphic 424 that is configured to indicate to the user when the mode of transportation used is changed. For example, the graphic 424 may display when user is to transfer from one type of mass transit system vehicle to another (e.g., from a bus to a light rail train, from a light rail train to a bus, from a bus to walking, and so on).

Figure 4B:
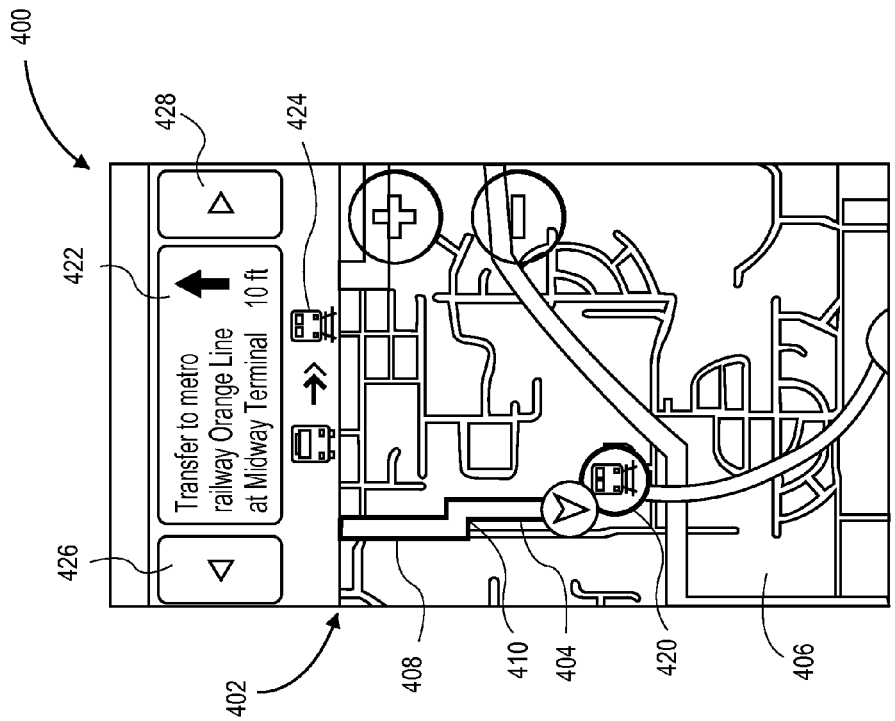
FIGS. 4A through 4E are illustrations depicting a progression of display screens of the portable electronic device of FIG. 1, wherein the display screens are configured to display route information that includes indications of transit stops made by mass transit system vehicles used along the route.
Figure 4A:
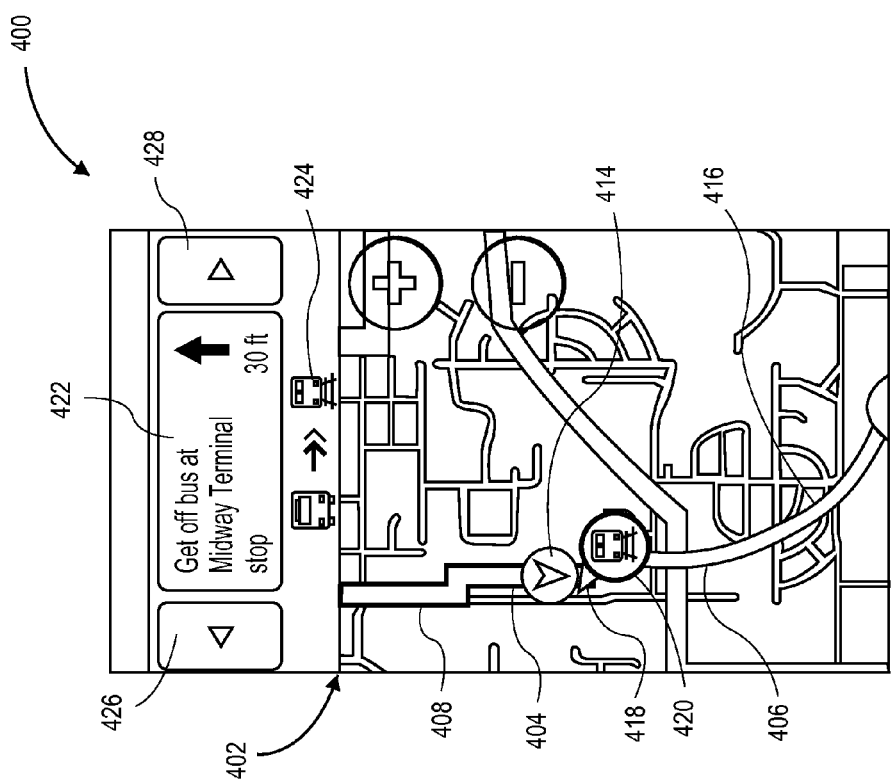
Figure 4D:
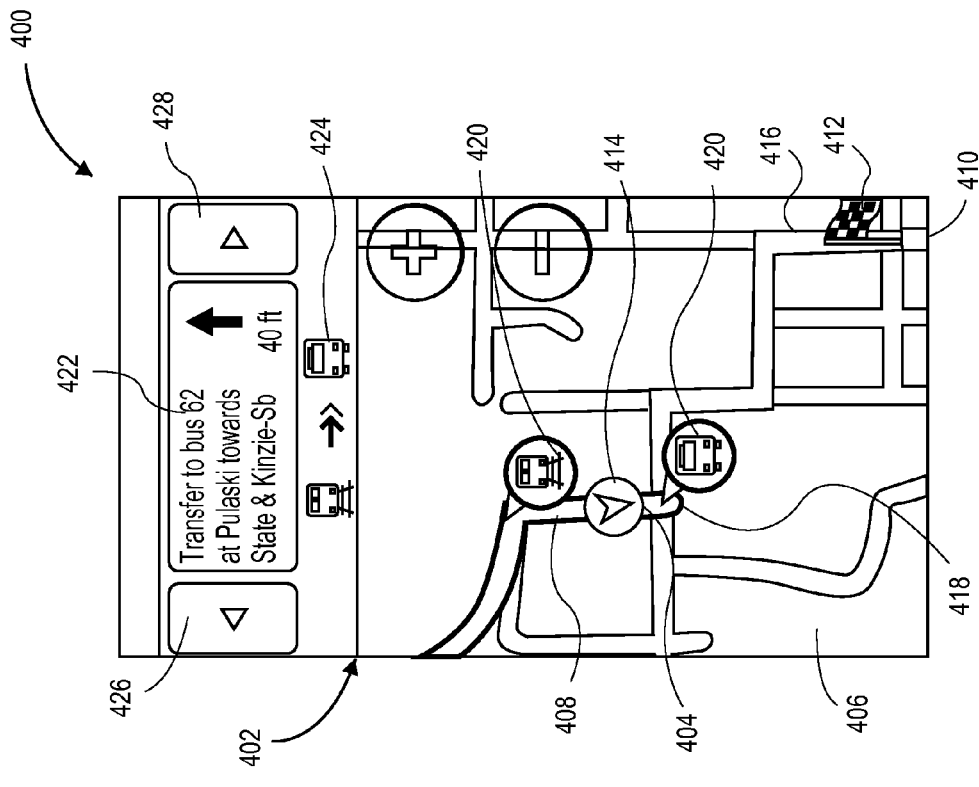
Figure 4C:
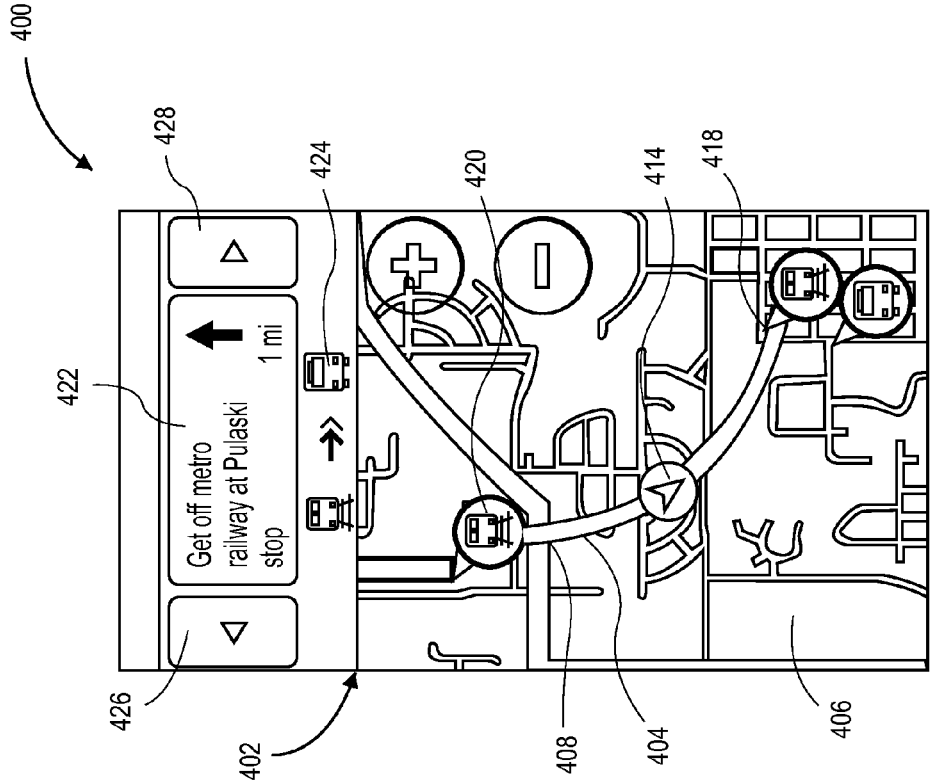
Figure 4E:
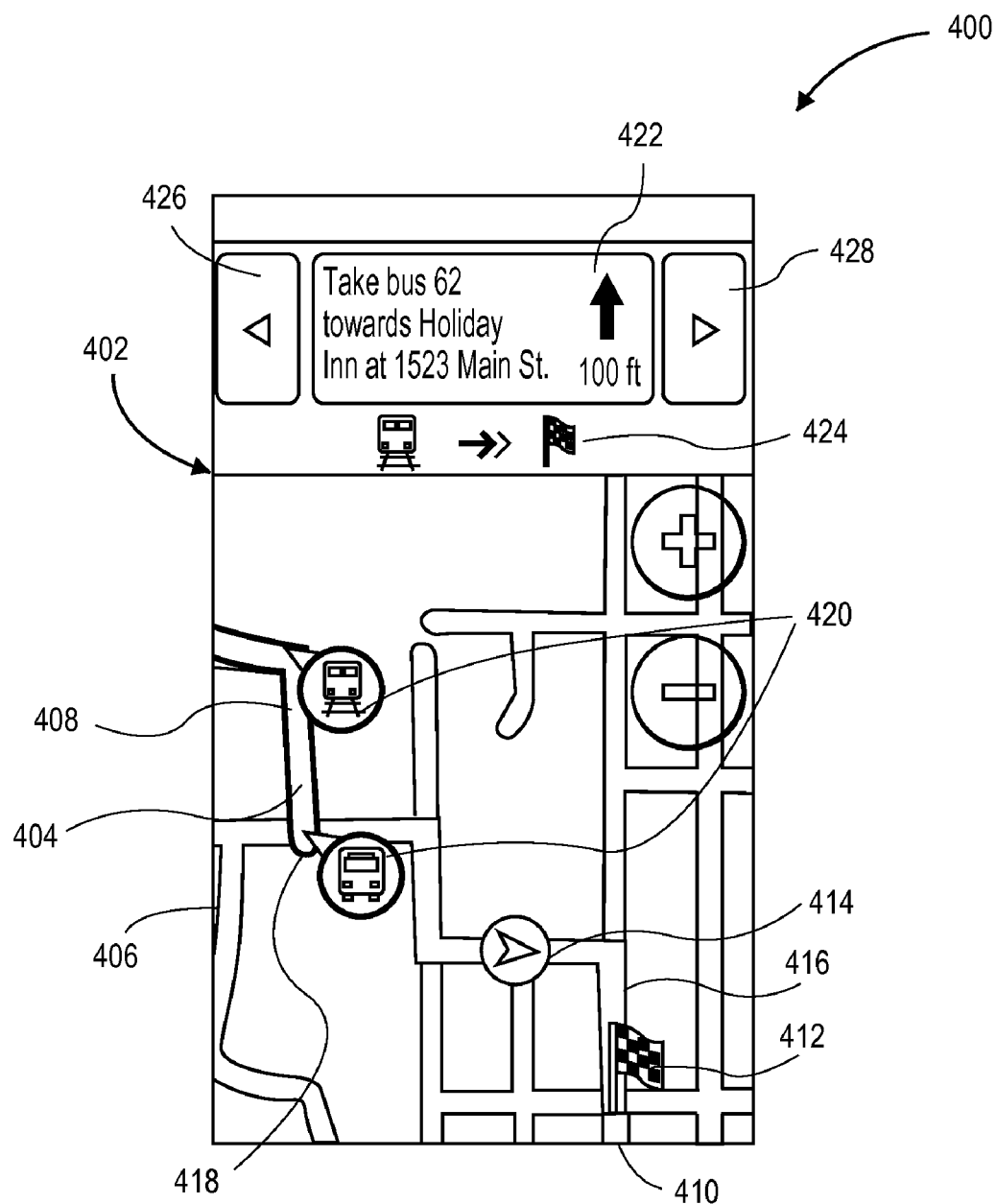

As shown, the navigation instructions 422 for the next leg 416 of the route 408 may be provided upon detection of the transit stop utilizing the techniques described herein. In this manner, the techniques described herein facilitate automatic sequencing through the legs 416 of the route 408 as the route 408 is traversed without user intervention. Additionally, when a transit stop is detected, the leg 416 of the route 408 preceding the transit stop may automatically be highlighted to indicate progress along the route 408. For example, as shown in FIGS. 4C and 4D, the portable electronic device 102 can employ the techniques described herein to detect the "Pulaski stop" made by the Metro railway to automatically advance the navigation instructions to the next step (e.g., "Get off of Metro railway at Pulaski stop.") A visual, audio, or tactile prompt may be provided. Arrow keys 426, 428 tab trough the navigation instructions 422, for example, to review previous instructions or to view future instructions.

Conclusion

Although techniques to provide automatic detection of transit stops made by a vehicle of a mass transit system have been described in language specific to structural features and/or methodological acts, it is to be understood that the appended claims are not necessarily limited to the specific features or acts described. Rather, the specific features and acts are disclosed as exemplary forms of implementing the claimed devices and techniques.

What is claimed is:

1. A portable electronic device comprising:
   an inertial sensor assembly operable to sense motion of a vehicle of a mass transit system in which a user of the portable electronic device is a passenger and generate a signal indicative of the vehicle motion;
   a memory operable to store a module; and
   a processing system operable to execute the module to utilize the inertial sensor assembly signal to detect the occurrence of a transit stop made along a route traversed by the vehicle;
   wherein the inertial sensor assembly comprises an accelerometer configured to detect acceleration of the portable electronic device caused by the motion of the vehicle;
   wherein the module is configured to determine that the transit stop is made by comparing the acceleration detected by the accelerometer with an acceleration profile describing the acceleration of the vehicle during the transit stop.

2. The portable electronic device as recited in claim 1, further comprising a timer configured to determine an elapsed time from a prior event, the module configured to utilize the elapsed time to confirm the occurrence of the transit stop.

3. The portable electronic device as recited in claim 1, further comprising a position-determining module operable to receive satellite navigation signals and determine a geographic position of the portable electronic device using the received satellite navigation signals, wherein the module is configured to utilize the geographic position to detect the occurrence of the transit stop.

4. The portable electronic device as recited in claim 3, wherein the module is configured to utilize the signal generated by the inertial sensor assembly to detect the occurrence of the transit stop when the geographic position is unavailable.

5. The portable electronic device as recited in claim 3, wherein the position-determining module comprises a global positioning system (GPS) receiver.

6. The portable electronic device as recited in claim 1, further comprising a communication module operable to detect the presence of a wireless network and utilize information associated with the wireless network to detect the occurrence of the transit stop.

7. The portable electronic device as recited in claim 1, further comprising a microphone operable to detect ambient sounds, wherein the module is configured to utilize the ambient sounds to detect the occurrence of the transit stop.

8. The portable electronic device as recited in claim 1, wherein the module comprises a Kalman filter configured to identify the occurrence of the transit stop.

9. The portable electronic device as recited in claim 1, further comprising a display device operable to display information to a user of the portable electronic device, the module configured to cause the display device to display a prompt in response to detection of the occurrence of the transit stop.

10. A method comprising:
    causing a display device of a portable navigation device to display route information describing at least part of a route traversed using a vehicle of a mass transit system;
    detecting the occurrence of a transit stop made by the vehicle along the route utilizing a signal generated by an inertial sensor assembly, the signal indicative of motion of the vehicle sensed by the inertial sensor assembly; and
    causing the display device to display a prompt in response to detection of the occurrence of the transit stop;
    wherein detecting the occurrence of the transit stop comprises comparing the acceleration detected by the accelerometer with an acceleration profile with an acceleration profile describing the acceleration of the vehicle during the transit stop.

11. The method as recited in claim 10, further comprising confirming the occurrence of the transit stop by determining an elapsed time from a previous transit stop and comparing the elapsed time to an expected elapsed time.

12. The method as recited in claim 10, further comprising obtaining a geographic position of the portable electronic device determined by a position-determining module and utilizing the geographic position to detect the occurrence of the transit stop.

13. The method as recited in claim 10, further comprising detecting the presence of a wireless network and utilizing information associated with the wireless network to detect the occurrence of the transit stop.

14. The method as recited in claim 10, further comprising causing the display device to display route information describing at least part of the route traversed by the vehicle, the route information including a plurality of legs traversed by the vehicle between transit stops, and sequencing between the legs as the route is traversed by the vehicle.

15. The method as recited in claim 14, wherein causing the display device to display a prompt in response to detection of the occurrence of the transit stop comprises sequencing of the route information to a leg of the route following the transit stop.

16. The method as recited in claim 14, wherein causing the display device to display a prompt in response to detection of the occurrence of the transit stop comprises displaying navigation information associated with the leg of the route following the transit stop.

17. A portable electronic device comprising:
    a display;
    a satellite navigation receiver operable to receive satellite navigation signals;
    a memory operable to store a navigation module and a transit stop detection module;

an accelerometer operable to sense acceleration of the portable electronic device and generate a signal indicative of the acceleration; and a processing system coupled with the display, the satellite navigation receiver, the memory, and the accelerometer, the processing system operable to execute the navigation module and the transit stop detection modules to— determine a geographic position of the portable electronic device using the received satellite navigation signals, calculate a route between the determined position of the portable electronic device and a destination, the calculated route including at least one leg to be traversed by a mass transit vehicle, use the acceleration signal to detect the occurrence of a transit stop made by the mass transit vehicle as part of the calculated route, and, in response to the detected transit stop, sequence to a next leg of the calculated route and display a prompt corresponding to the sequencing on the display;

determine that the transit stop is made by comparing the acceleration detected by the accelerometer with an acceleration profile describing the acceleration of the vehicle during the transit stop.

18. The portable electronic device as recited in claim 17, further comprising a timer configured to determine an elapsed time from a prior event, the module configured to utilize the elapsed time to confirm the occurrence of the transit stop.

19. The portable electronic device as recited in claim 17, wherein the sequencing prompt presented on the display comprises navigation information associated with the next leg of the calculated route.

20. The portable electronic device as recited in claim 17, wherein the sequencing prompt presented on the display comprises an alert regarding the detected transit stop and the next leg of the calculated route.

* * * * *